United States Patent [19]

Koike et al.

[11] Patent Number: 4,590,340

[45] Date of Patent: May 20, 1986

[54] STEERING WHEEL ASSEMBLY FOR VEHICLES

[75] Inventors: Yasuhisa Koike; Kazuhiro Kaneko; Kazuo Inaba; Naoki Yamamoto, all of Fuji, Japan

[73] Assignee: Nihon Plast Co., Ltd., Fuji, Japan

[21] Appl. No.: 696,143

[22] Filed: Jan. 29, 1985

[51] Int. Cl.$^4$ ............................................. H01H 9/00
[52] U.S. Cl. ............................... 200/61.54; 200/61.55; 200/61.57
[58] Field of Search .................... 200/61.54–61.57, 200/159 R

[56]  References Cited

U.S. PATENT DOCUMENTS

| | | | |
|---|---|---|---|
| 1,683,988 | 9/1928 | Reading | 200/61.57 X |
| 1,967,030 | 7/1934 | Kull | 200/159 R |
| 2,061,222 | 11/1936 | Creson | 200/61.55 |
| 3,223,797 | 12/1965 | Ordorica et al. | 200/61.54 |
| 3,517,145 | 6/1970 | Wallace | 200/61.57 X |
| 4,447,684 | 5/1984 | Sugiyama | 200/61.54 |

FOREIGN PATENT DOCUMENTS 495010  6/1954  Italy ................... 200/61.55

Primary Examiner—J. R. Scott
Attorney, Agent, or Firm—Armstrong, Nikaido, Marmelstein & Kubovcik

[57]  ABSTRACT

An automotive steering wheel assembly has a metallic core and an outer covering of a molded soft plastic material in which switch-receiving recesses are formed for horn switch assemblies each including a base of a hard plastic material, a plastic switch button movably mounted on the base and carrying a movable contact thereon and springs disposed between the switch button and the base. The assembly is inserted into an associated recess and secured to a bracket with a stationary contact disposed in alignment with the movable contact and held between the bracket and the base. The bracket is secured to the metallic core of the steering wheel. The base is so shaped and sized as to be press-fitted into the recess to slightly outwardly deform the surrounding inner peripheral surface of the recess in the plastic outer covering to thereby prevent the occurrence of substantial dimensional change of the recess which would otherwise be caused by thermal deformation of the plastic outer covering during operation of the steering wheel.

10 Claims, 6 Drawing Figures

STEERING WHEEL ASSEMBLY FOR VEHICLES

BACKGROUND OF THE INVENTION

1. Field of the Invention

The present invention relates to a steering wheel assembly for vehicles such as automobiles and, more particularly, to a horn switch mechanism mounted on the steering wheel assembly.

2. Description of the Prior Art

The prior art horn switch mechanism on a steering wheel had to be made by troublesome steps, i.e., by mounting each of the component parts of the mechanism one after another on the steering wheel body, as disclosed in Japanese Utility Model Publication No. 58-4757. For this reason, an experimental switch-button pushing operation by the manufacturer had to be conducted after the completion of mounting of all of the component parts of the switch mechanism on the steering wheel body. If the switch was found to be defective, complicated and troublesome steps were required to remedy the defect with a resultant low yield of manufacture.

The prior art has another problem that the outer covering of a soft plastic material such as vinyl chloride or urethane molded on a metallic core of the steering wheel body tends to be thermally deformed. In the case where the horn switch mechanism is mounted in a recess or switch-receiving space formed in the plastic outer covering, as in many automotive steering wheels, if the thermal deformation of the plastic outer covering displaces the inner peripheral surface of the switch-receiving space inwardly due to thermal deformation of the covering, the horn switch button cannot be smoothly pushed to move a movable switch contact member into contact with a stationary switch contact member. On the other hand, if the inner peripheral surface of the switch-receiving space in the outer covering is outwardly displaced by thermal deformation, the gap between the horn switch button and the surrounding inner peripheral edge of the switch-receiving space or recess in the outer covering is increased or expanded to spoil the outer appearance of the steering wheel.

SUMMARY OF THE INVENTION

It is a first object of the present invention to provide a steering wheel assembly for a vehicle in which at least a part of the component parts of the horn switch mechanism can be assembled into a horn switch assembly before the component parts are mounted on the steering wheel body.

It is a second object of the present invention to provide a steering wheel assembly for a vehicle which is of the type that includes a core and an outer covering of a molded soft plastic material and in which the dimension of the switch-receiving space in the plastic outer covering is prevented from being substantially varied due to thermal deformation of the outer covering.

According to one feature of the present invention, there is provided a steering wheel assembly for a vehicle which comprises a steerihg wheel body defining therein at least one switch-receiving space; and a horn switch assembly received in the space and secured to the steering wheel body; the horn switch assembly including a base of an electrically insulating material disposed in the space and fixed to the steering wheel body, a horn switch button member of an electrically insulating material having a stem portion movably extending through a through-hole in the base, spring means resiliently biasing the horn switch button member away from the base and a movable contact of a metal secured to the free end of the stem portion. A stationary contact may preferably be formed of a piece of metal disposed in alignment with, but normally spaced from, the movable contact. Preferably, the metal piece may be supported by a bracket member disposed in the witch-receiving space and mechanically and electrically connected by the bracket member to a metallic core of the steering wheel body.

According to another feature of the present invention, there is provided a steering wheel for a vehicle which comprises a steering wheel body including a core and an outer covering of a molded soft plastic material defining therein at least one switch-receiving space and a horn switch means including a base of a relatively rigid material received in the space and having an outer periphery at least a part of which is disposed in pressure-contact with the inner peripheral surface of the space, a horn switch button member of an electrically insulating material movably mounted on the base and so shaped and sized as not to be contacted by the inner peripheral surface of the space, the horn switch means further including a movable contact carried by the horn switch member for movement therewith and a stationary contact disposed in alignment with, but normally spaced from, the movable contact and fixed relative to the steering wheel body.

The pressure-contact of the rigid base with the inner peripheral surface of the switch-receiving space is effective to prevent the soft plastic material of the outer covering from being thermally deformed into the path of movement of the horn switch button member. For this reason, the steering wheel assembly of the invention can be designed such that the gap between the horn switch button member and the surrounding inner peripheral surface of the switch-receiving space is smaller than the gap required in the prior art steering wheel assembly to provide an improved outer appearance of the steering wheel.

The above and other objects, features and advantages of the present invention will be made more apparent by the following description with reference to the accompanying drawings.

DESCRIPTION OF PREFERRED EMBODIMENTS

Figure 1:
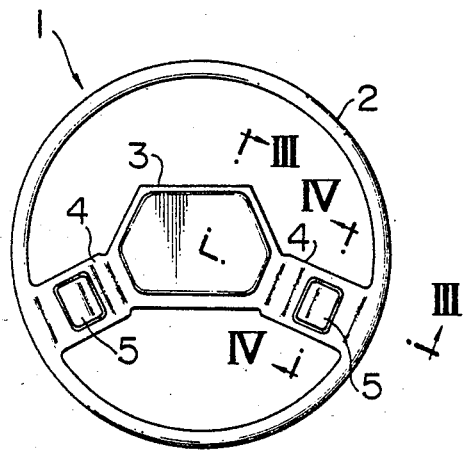
FIG. 1 is a plan view of an automotive steering wheel assembly embodying the present invention.
Figure 2:
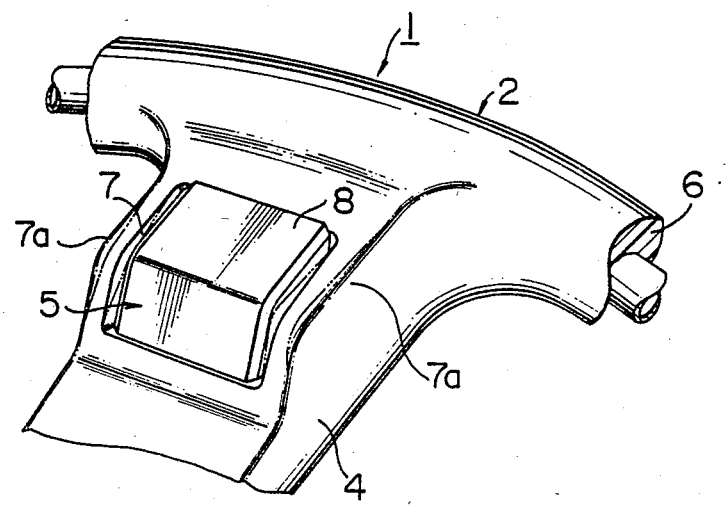
FIG. 2 is a fragmentary perspective view of the steering wheel assembly shown in FIG. 1.
Figure 3:
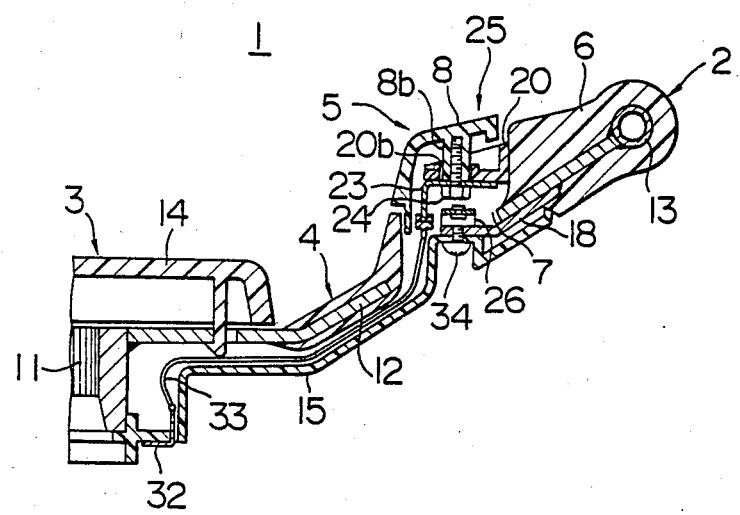
FIG. 3 is a sectional view of the steering wheel taken along line III—III in FIG. 1.

Referring first to FIG. 1 of the drawings, an automotive steering wheel assembly 1 includes a circular body comprising a rim section 2, a central hub section 3 and a pair of substantially radial spoke sections 4 each interconnecting the rim and hub sections 2 and 3. A horn switch 5 is mounted on each spoke section 3.

Referring to FIGS. 2 to 5, the hub section 3 includes a hub member 11 of a metal adapted to be secured to a steering shaft (not shown) of an associated automobile in known manner. The rim section 2 includes a circular rim core 13 of a metal tube. The spoke sections 4 each include a spoke core 12 made of a stamped sheet metal welded at the radially inner and outer ends to the hub member 11 and the rim core 13. The rim core 13 and the spoke cores 12 except for the radially inner end portions thereof are covered with a soft plastic material, such as PVC or urethane, molded over the rim and spoke cores. The hub member 11 and the uncovered radially inner end portions of the spoke cores 12 are covered with upper and lower cover members 14 and 15 of a molded plastic material such as PP or ABS. The part of the soft plastic outer covering 6 of each spoke section 4 adjacent to the rim section 2 is formed therein with a through-hole extending from the upper surface of the covering to the bottom surface thereof. The spoke cores 12 are each formed therein with an opening 12a aligned with, but slightly smaller than, the throughhole. A bracket member 18 of a metal is welded to the underside of the spoke core 12 and extends into the through-hole. The through-hole and the bracket member 18 cooperate together to form a recess or space 7 for receiving one of the horn switches 5.

Each horn switch 5 comprises a horn switch assembly 25 which includes a base 20 of a relatively hard molded plastic material (such as PP or ABS) including a planar section which has an outer periphery at least a part of which is disposed in pressure-contact with the inner peripheral surface of the recess 7. the planar section of the base 20 is formed therein with a pair of through-holes or apertures 20a adjacent to the opposite sides of the planar section and with a central through-hole 20b. A horn switch button member 8 of a molded plastic material is mounted on the base 20. The member 8 includes a top wall portion, a pair of pawls 8a extending inwardly from the top wall portion and a stem portion 8b also extending inwardly from the top wall portion in substantially parallel relationship to the pawls 8a. The pawls 8a are snapped into the apertures 20a in the base 20, while the stem portion 8b extends slidably through the through-hole 20b and has a free or lowermost end portion to which a movable contact member 23 formed of a stamped sheet metal is secured by a screw 24. Compression coil springs 21 are interposed between the base 20 and the top wall portion of the switch button member 8 to complete the horn switch assembly 25. It will be appreciated that the assembly 25 can be prepared before the component parts thereof are mounted on the steering wheel body. Thus, before the assembly 25 is mounted on the steering wheel body, an experimental test can be effected to check the operability of the switch buttom member 8. If any defect in the switch operability is found, the assembly 25 can easily be adjusted to remedy the defect. This feature of the invention greatly simplifies the manufacture of steering wheel assemblies.

In the embodiment of the invention, the planar section of the base 20 is shaped and sized such that, when the assembly 25 is mounted on one of the two spokes 4 of a steering wheel body, the planar section of the base 20 must be urged or press-fitted into the recess 7 to cause the outer peripheral edge of the planar section to resiliently deform the side walls 7a of the recess 7 outwardly so that the outwardly deformed side walls 7a leave a gap $\alpha$ between each of the recess side walls 7a and the associated side of the switch buttom member 8. Stress is formed in the plastic material in the recess side walls 7a and tends to restore the side walls 7a inwardly to the initial positions. Thus, if the plastic covering is subjected to a high temperature at which the side walls 7a would otherwise tend to be deformed outwardly, such a tendency of outward deformation can merely relieve the initial stress in the outer covering plastic material. Thus, the temperature rise does not result in any substantial increase in the dimension of the gap $\alpha$. In addition, the planar section of the base 20 acts as a support bearing against the inner peripheral surface of the recess 7 to prevent inward thermal deformation of the side walls 7a which took place in the prior art, as shown by broken lines in FIG. 2.

Figure 4:
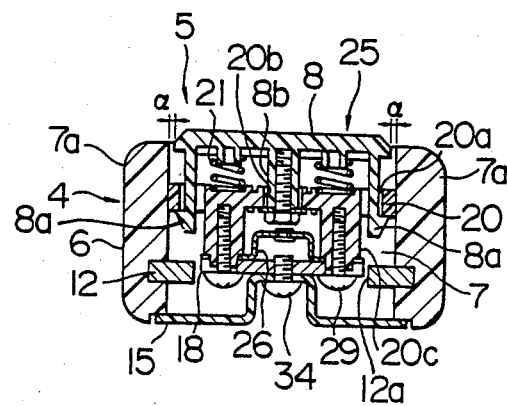
FIG. 4 is a sectional viw of the steering wheel taken along line IV—IV in FIG. 1.
Figure 5:
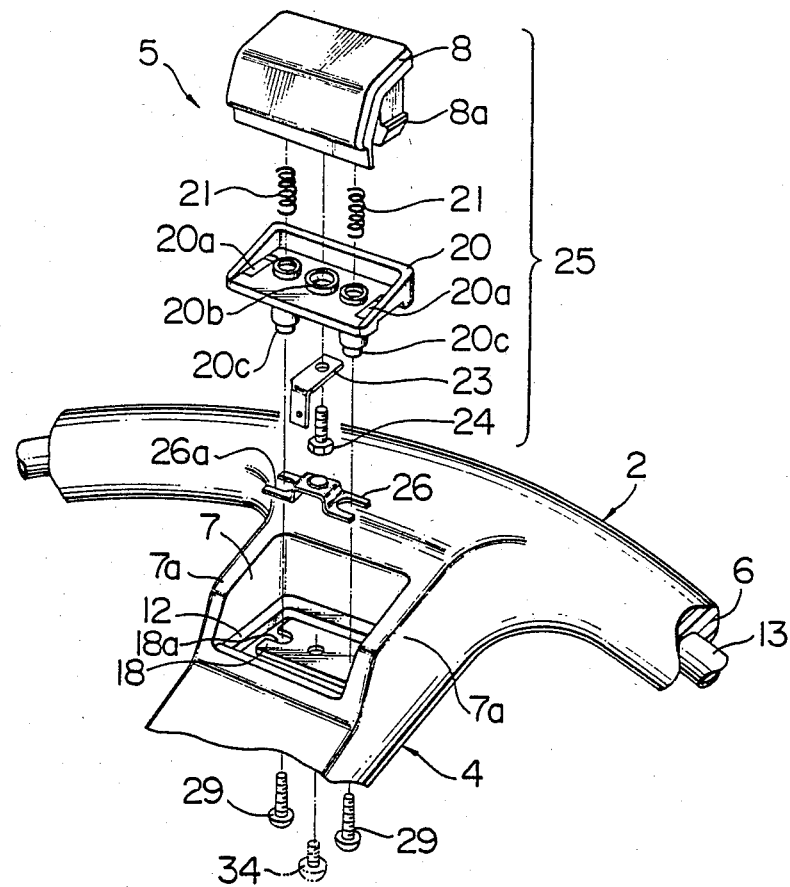
FIG. 5 shows component parts of a horn switch mechanism in disassembled positions.

Referring to FIGS. 4 and 5, the base 20 of the horn switch assembly 25 has a pair of post-like portions 20c which, when the horn switch assembly 25 is inserted into the recess 7 to a predetermined depth with a stationary contact member 26 placed on the bracket member 18, reach the bracket member 18. More specifically, the stationary contact member 26 is formed of a stamped sheet metal having opposite end portions in which notches 26a are formed, as best seen in FIG. 5. The post-like portions 20c have reduced lower end portions providing downwardly directed annular shoulders which cooperate with the upper surface of the bracket member 18 to hold the end portions of the stationary contact member 26 with the reduced end portions of the post-like poritons 20c extending through the notches 26a in the stationary contact member 26 into notches 18a in the bracket member 18. Screws 29 secure the post-like portions 20c to the bracket member 18.

The movable contact member 23 is electrically connected by a conductor 33 to a slip ring 32 secured to the lower cover 15 which is secured to the underside of the bracket member 18 by a screw 34. The stationary contact member 26 is electrically connected to the hub member 11 of the hub section 3 through the bracket member 18 and the spoke core 12.

In operation, the horn switch button member 8 can be pushed or depressed downwardly against the springs 21 to move the head of the screw 24 into contact with the stationary contact member 26. Because the screw 24 is always in mechanical and electrical contact with the movable contact member 23, the engagement between the screw 24 and the stationary contact member 26 closes an electrical circuit for a horn system, not shown. Thus, the screw 24 forms a part of the movable contact. When the downward force is removed from the switch button member 8, it can be upwardly returned to its normal upper position by the springs 21.

Figure 6:
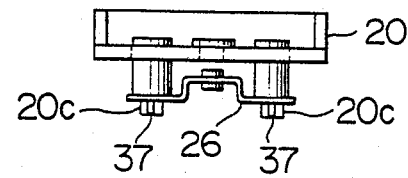
FIG. 6 is a front elevation of a modified base of the horn switch mechanism.

FIG. 6 shows a modification to the base 20 of the horn switch assembly 25. The modification comprises a rib 37 formed on the peripheral surface of the reduced lower end portion of each of the post-like portions 20c. The lower end portions of the post-like portions 20c, including the ribs 37 thereon, are so dimensioned and shaped as to be frictionally engaged with the notches 26a in the ends of the stationary contact member 26 so that the stationary contact member 26 can be frictionally attached to the lower end portions of the postlike portions 20c of the base 20 before the assembly 25 is inserted into the switch-receiving space or recess 7 in the plastic outer covering of the steering wheel body. In this modification, therefore, the stationary contact member 18 forms a part of the pre-fabricated horn switch assembly 25.

The pawls 8a provided on the bottom surface of the switch button member 8 are not essential for the horn switch assembly 25 because the movable contact member 23 secured by the screw 24 to the bottom end of the stem 8b of the switch button member 8 is operative to retain the switch button member against removal from the base 20 by the action of the springs 21. However, the pawls 8a act as auxiliary guide means which assures reliable and smooth reciprocal movement of the switch button member 8 relative to the base 20.

The bracket member 18 employed in the illustrated and described embodiment is not essential for the invention because the steering wheel assembly according to the present invention can be modified such that the switch assembly 25 be mounted directly on the spoke core 12. Moreover, the spoke core 12 can act as a stationary contact means to eliminate the necessity for the stationary contact member 26 of a sheet metal.

Furthermore, it is not essential for the invention that the spoke cores 12 are formed from stamped sheet metal. The spoke cores may alternatively be formed from an elongated metal rod or tube. In such a case, however, the bracket member 18 is preferably used to assure that the switch assembly 25 can easily be secured to the spoke core 12.

What is claimed is:

1. A steering wheel assembly for a vehicle comprising:
   a steering wheel body defining therein at least one switch-receiving space; and
   a horn switch assembly received in said space and secured to said steering wheel body;
   said horn switch assembly including:
      a base of an electrically insulating material disposed in said space and fixed to said steering wheel body, said base being formed therein with a through-hole;
      a horn switch button member of an electrically insulating material having a stem portion extending inwardly through said through-hole for movement relative to said base;
      spring means resiliently biasing said horn switch button member away from said base;
      a movable contact of a metal secured to the free end of said stem portion; and
      a stationary contact means for making contact with said movable contact means, said stationary contact disposed in said space inwardly from said base and fixed to said steering wheel body ad in alignment with, but normally spaced from, said movable contact.

2. A steering wheel assembly for a vehicle comprising:
   a steering wheel body defining therein at least one switch-receiving space;
   a horn switch assembly received in said space and secured to said steering wheel body;
   said horn switch assembly including:
      a base of an electrically insulating material disposed in said space and fixed to said steering wheel body, said base being formed therein with a through-hole;
      a horn switch button member of an electrically insulating material having a stem portion extending inwardly through said through-hole for movement relative to said base;
      spring means resiliently biasing said horn switch button member away from said base;
      movable contact of a metal secured to the free end of said stem portion; and
      a stationary contact means for making contact with said movable contact disposed in said space inwardly from said base and fixed to said steering wheel body and in alignment with, but normally spaced from, said movable contact; and wherein said steering wheel body includes a substantially circular rim section, a central hub section and at least one spoke section interconnecting said rim and central hub sections, said central hub section including a hub of a metal adapted to be secured to a steering shaft of the vehicle, said spoke section including a metallic spoke core mechanically and electrically connected at one end to said hub, said spoke section further including an outer covering of a molded plastic material, said switch-receiving space being formed in said spoke section outer covering, said base of said horn switch assembly being fixed relative to said spoke core.

3. A steering wheel assembly according to claim 2, further including a bracket member disposed in said switch-receiving space and electrically and mechanically connected to said spoke core, and wherein said stationary contact means comprises a stationary contact member of a metal electrically and mechanically connected to said bracket member.

4. A steering wheel assembly according to claim 3, wherein said base includes a substantially planar portion and integral post-like portions extending therefrom to said bracket member and secured thereto.

5. A steering wheel assembly according to claim 4, wherein said stationary contact member is formed by a sheet metal having portions retained between said post-like sections of said base and said bracket member.

6. A steering wheel assembly according to claim 5, wherein the free end portions of said post-like portions of said base and said portions of said stationary contact member are shaped such that they can be mechanically connected to each other by frictional engagement only.

7. A steering wheel assembly according to claim 6, further comprising a slip ring fixed to said hub section, wherein said movable contact is electrically connected to said slip ring.

8. A steering wheel assembly according to claim 2, wherein said base is further formed therein with at least one additional through-hole and said switch button member has a pawl extending substantially parallel to said stem portion and snapped into said additional through-hole.

9. A steering wheel assembly according to claim 3, wherein said base includes a substantially planar section having an outer periphery at least a part of which is disposed in pressure-contact with the inner peripheral surface of said switch-receiving space.

10. A steering wheel assembly for a vehicle comprising:
    a steering wheel body including a core and an outer covering of a molded soft plastic material defining therein at least one switch-receiving space; and
    a horn switch means including a base of a relatively stiff material having a through-hole therein and fixedly received in said space, and a horn switch button member of an electrically insulating material having a stem portion movable with respect to said base and extending inwardly through said through-hole, said base having an outer periphery, at least a part of which is in pressure-contact with the inner peripheral surface of said space to deform said inner peripheral surface away from said horn switch button member;

said horn switch means further including a movable contact fixed to the free end of said stem portion for movement therewith and a stationary contact disposed in said space in alignment with, but normally spaced from, said movable contact and fixed to the core of said steering wheel body.

* * * * *